US007478368B2

(12) United States Patent
Hoover, Jr. et al.

(10) Patent No.: US 7,478,368 B2
(45) Date of Patent: Jan. 13, 2009

(54) ORGANIZATION AND VISUALIZATION OF PERFORMANCE DATA IN SELECTED DISPLAY MODES

(75) Inventors: Theodore G. Hoover, Jr., New Paltz, NY (US); Sean S. Safron, Hurley, NY (US); Jhy-Chun Wang, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 2107 days.

(21) Appl. No.: 09/841,088

(22) Filed: Apr. 24, 2001

(65) Prior Publication Data

US 2002/0156825 A1    Oct. 24, 2002

(51) Int. Cl.
*G06F 9/44* (2006.01)
*G06F 3/048* (2006.01)
(52) U.S. Cl. .................. 717/125; 717/124; 715/771
(58) Field of Classification Search ......... 717/124–135; 715/771, 772; 714/E11.217
See application file for complete search history.

(56) References Cited

U.S. PATENT DOCUMENTS

| | | | | |
|---|---|---|---|---|
| 5,168,554 A | * | 12/1992 | Luke ....................... | 715/209 |
| 5,530,942 A | * | 6/1996 | Tzou et al. ............... | 715/202 |
| 6,016,474 A | * | 1/2000 | Kim et al. ................ | 717/125 |
| 6,026,362 A | * | 2/2000 | Kim et al. ................ | 705/1 |
| 6,075,530 A | | 6/2000 | Lucas et al. .............. | 345/339 |
| 6,101,524 A | | 8/2000 | Choi et al. ............... | 709/102 |
| 6,119,075 A | | 9/2000 | Dean et al. ............... | 702/186 |
| 6,226,787 B1 | * | 5/2001 | Serra et al. ............... | 717/125 |
| 6,332,212 B1 | * | 12/2001 | Organ et al. .............. | 717/128 |
| 6,378,125 B1 | * | 4/2002 | Bates et al. ............... | 717/129 |
| 6,412,106 B1 | * | 6/2002 | Leask et al. .............. | 717/124 |
| 6,434,714 B1 | * | 8/2002 | Lewis et al. .............. | 714/38 |
| 6,539,390 B1 | * | 3/2003 | Kiczales et al. .......... | 707/101 |
| 6,553,564 B1 | * | 4/2003 | Alexander et al. ........ | 717/128 |
| 6,611,276 B1 | * | 8/2003 | Muratori et al. .......... | 715/772 |

OTHER PUBLICATIONS

Flautner et al., "Thread-level Parallelism and Interactive Performance of Desktop Applications," Nov. 2000, ACM, p. 129-138.*

* cited by examiner

*Primary Examiner*—Wei Y Zhen
*Assistant Examiner*—Qing Chen
(74) *Attorney, Agent, or Firm*—Geraldine D. Monteleone, Esq.; Blanche E. Schiller, Esq.; Heslin Rothenberg Farley & Mesiti P.C.

(57) ABSTRACT

Performance data is organized and displayed in selected display modes to facilitate an analysis of the data. The performance data includes various data, such as profile data associated with thread activity of one or more applications. In order to gain a better understanding of the data, a user can dynamically select between different display modes. The different display modes include a function-centric mode focusing on activities within a function and a thread-centric mode focusing on activities of an individual thread.

27 Claims, 10 Drawing Sheets

ORGANIZATION AND VISUALIZATION OF PERFORMANCE DATA IN SELECTED DISPLAY MODES

TECHNICAL FIELD

This invention relates, in general, to performance optimization, and in particular, to the organization and display of performance data in selected display modes to facilitate performance optimization.

BACKGROUND ART

In many computing environments, performance data is collected and analyzed to fine-tune the performance of one or more applications. This performance data has been gathered, in the past, on a per application basis.

With the advance of multi-threaded applications, however, it has become important to gain insight into an application's thread activities in order to properly fine-tune the application's performance. Thus, performance collection tools have recently been developed to enable the collection, at runtime, of an individual thread's performance data.

Although data collection tools have so advanced, it still remains a challenge to be able to process and arrange the performance data in ways that can help users easily analyze an application's performance data. Thus, a need exists for a capability that facilitates the organization and visualization of performance data. A further need exists for a capability that enables users to view the data in various selected modes.

SUMMARY OF THE INVENTION

The shortcomings of the prior art are overcome and additional advantages are provided through the provision of a method of presenting data. The method includes, for instance, selecting a display mode for displaying thread data of one or more threads of at least one application, and displaying the thread data based on the selected display mode. The display mode includes one of a function-centric display mode and a thread-centric display mode.

In a further aspect of the present invention, a method of presenting data is provided. The method includes, for instance, selecting a display mode from a plurality of display modes for displaying performance data of one or more threads of an application, and displaying the performance data of the one or more threads based on the selected display mode. The plurality of display modes includes a thread-centric display mode focused on an individual thread's activity.

In a further embodiment of the invention, a method of presenting data is provided. The method includes, for instance, creating a plurality of data structures to be used in displaying performance data of at least one application, wherein at least one data structure of the plurality of data structures has associated therewith performance data of at least one thread of the at least one application; and presenting the one or more data structures in an organizational structure, wherein the organizational structure is based on at least one of functional activities within the at least one application and thread activities within the at least one application.

In a further aspect of the invention, a memory for storing data to be displayed is provided. The memory includes, for instance, a data construct usable in data visualization. The data construct includes, for instance, one or more process objects representing one or more executable entities; and one or more thread objects associated with at least one process object of the one or more process objects. The one or more thread objects include performance data representing runtime thread activity.

System and computer program products corresponding to the above-summarized methods are also described and claimed herein.

One or more capabilities of the present invention advantageously enable performance data to be organized and displayed in various modes, which facilitate analysis of an application's performance data by a user from different focus points. In one embodiment, this data includes thread data, which can be viewed from different perspectives. For example, the thread data can be displayed in a function-centric or thread-centric mode. Further, users can switch between the two modes, as desired.

In one embodiment, the data is displayed in a hierarchical tree format, in which the performance data of the one or more threads is represented by one or more branches within the tree.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, performance data is organized and displayed in a manner that facilitates data analysis. The performance data includes various data, such as, for instance, profile data associated with thread activity of one or more applications.

As one example, the performance data can be organized and displayed in a plurality of display modes, including a function-centric mode focusing on a function's perspective, and a thread-centric mode focusing on a thread's perspective. Further, in one example, a user can dynamically switch between the plurality of modes.

Figure 1:
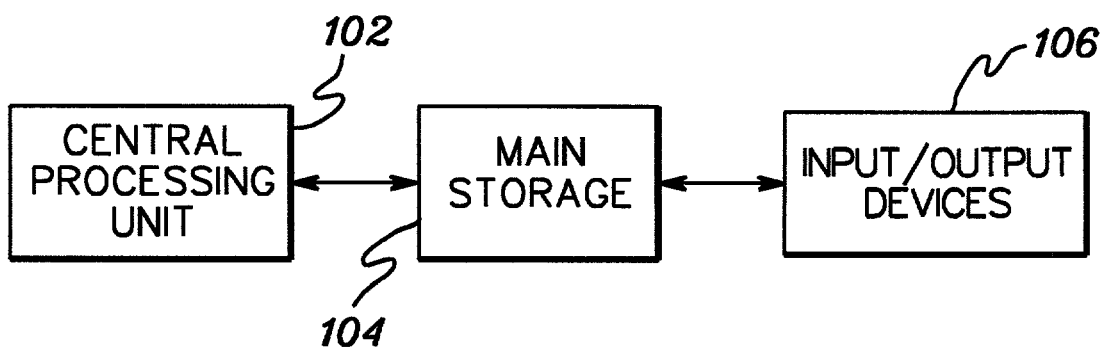
FIG. 1 depicts one embodiment of a computing environment incorporating and using aspects of the present invention.
Figure 2A:
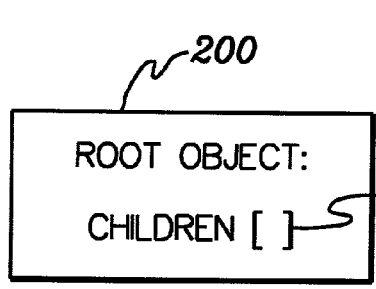
FIGS. 2a-2f depict various data structures used in accordance with an aspect of the present invention.
Figure 2D:
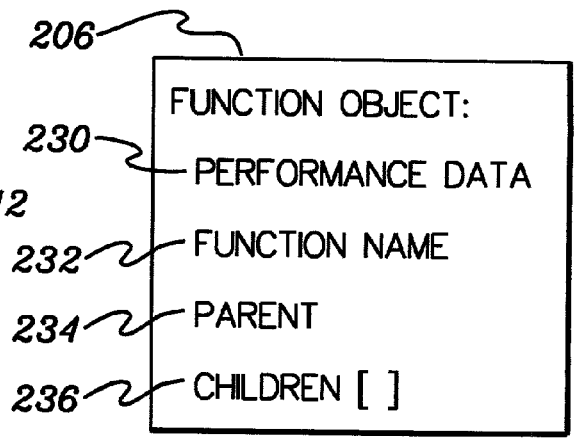
Figure 2B:
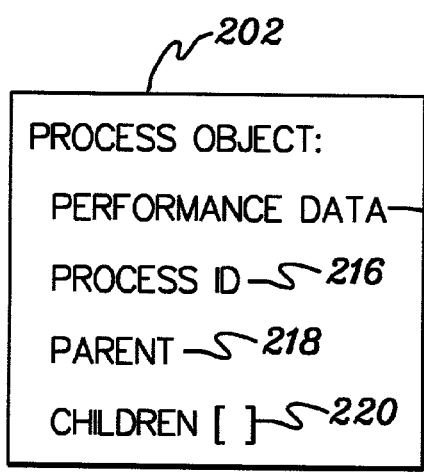
Figure 2E:
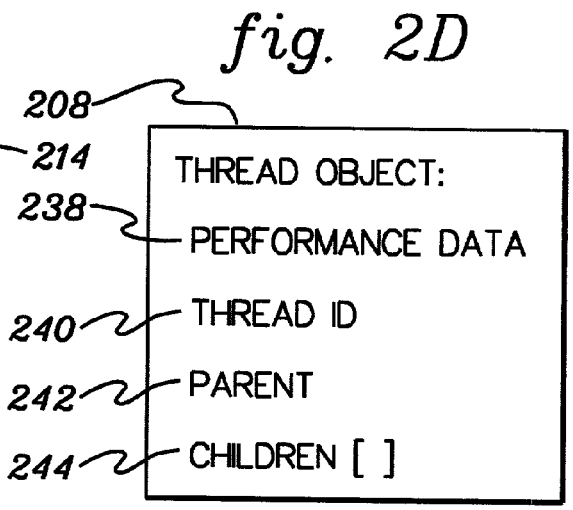
Figure 2C:
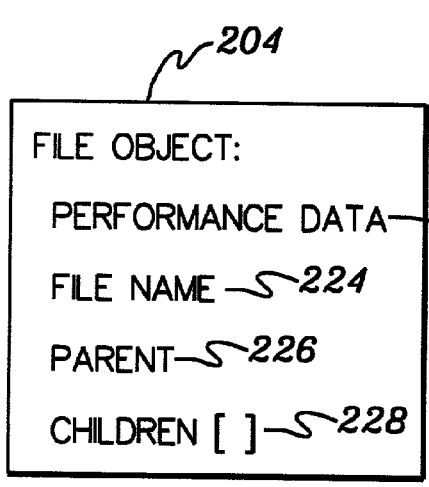
Figure 2F:
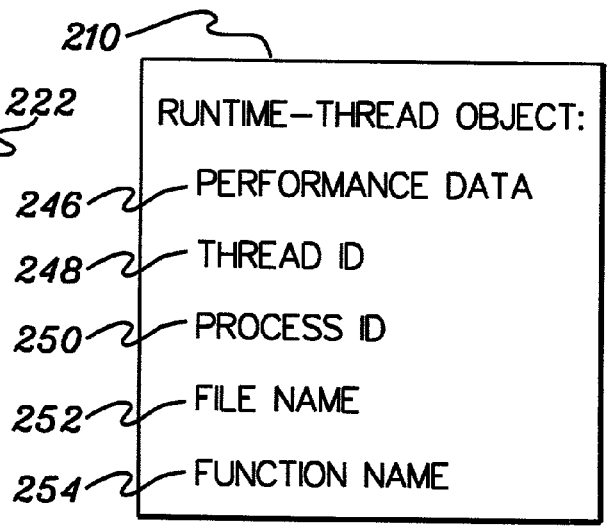

One example of a computing environment incorporating and using aspects of the present invention is depicted in FIG. 1. In one example, a computing environment 100 includes, for instance, at least one central processing unit (CPU) 102, a main storage 104, and one or more input/output devices 106, each of which is described below.

As is known, central processing unit 102 is the controlling center of the computing environment and provides the sequencing and processing facilities for instruction execution, interruption action, timing functions, initial program loading and other machine related functions. The central processing unit executes at least one operating system used to control the operation of the computing environment by controlling the execution of other programs, controlling communication with peripheral devices and controlling use of the computer resources.

Central processing unit 102 is coupled to main storage 104, which is directly addressable and provides for high-speed processing of data by the central processing unit. Main storage 104 may be either physically integrated with the CPU or constructed in stand alone units.

Main storage 104 is also coupled to one or more input/output devices 106. These devices include, for instance, keyboards, communications controllers, teleprocessing devices, printers, magnetic storage media (e.g., tape, disks), direct access storage devices and sensor-based equipment. Data is transferred from main storage 104 to input/output devices 106, and from the input/output devices back to main storage.

In one example, computing environment 100 is a single system environment, which includes an RS/6000 computer system running an AIX operating system. (RS/6000 and AIX are offered by International Business Machines Corporation.) The invention is not limited to such an environment, however. The capabilities of the present invention can be incorporated and used within many types of computing environments and many types of computer systems. For instance, computing environment 100 can include a UNIX workstation running a UNIX-based operating system. Other variations are also possible and are considered a part of the claimed invention.

In yet another embodiment, computing environment 100 is a multisystem environment in which various computing units are coupled together via a connection, such as a wire connection, a token ring or network connection, to name just a few examples. Further, the computing environment may include a large parallel system with a plurality of units coupled to one another via a network connection, such as a switch. Again, the capabilities of the present invention are usable with many types of computing environments, as well as other types of communications systems.

Within the computing environment, one or more executable entities (e.g., applications, programs, tasks) are run and performance data is collected for one or more of those entities. In one aspect of the present invention, the performance data is stored within data structures, such as objects. In particular, various objects are defined to represent the performance data collected at different execution levels.

One embodiment of the various objects used by one or more aspects of the present invention is illustrated in FIGS. 2a-2f. The objects include, for instance, a root object 200 (FIG. 2a), which is the root of a data construct used to display the performance data; a process object 202 (FIG. 2b), which represents an executable entity (e.g., a program, an application, or a task in a multi-task application); a file object 204 (FIG. 2c), which represents a source code file of the executable entity; a function object 206 (FIG. 2d), which represents a function of the source code file; a thread object 208 (FIG. 2e), which represents a runtime thread activity; and a runtime-thread object 210 (FIG. 2f) used to collect performance data as a thread enters and exits a function. Further details associated with each object are described below.

Root object 200 is the root of a hierarchical data construct used to display the performance data of various components of one or more executable entities. The root object has one or more children 212. As one example, the children include one or more process objects 202.

A process object is associated with a process. A process represents an application's execution image and is created when an application is set to run in the computing environment. Process object 202 includes, for instance, performance data 214 representing the performance of the process corresponding to this object; a process identifier 216 identifying the process for which the object was defined; a parent indicator 218 indicating the parent of the process object (e.g., the root); and one or more children 220. The type of children of the process object is dependent on whether the selected organization and visual mode is function-centric or thread-centric, as described below.

As one example, in the function-centric mode, the children of a process are file objects. A file object represents a source code file of an executable entity. Each executable entity can have one or more source code files. File object 204 includes, for example, performance data 222 representing the performance of the file designated by a file identifier 224; a parent indicator 226; and one or more children 228. In one example, children 228 include one or more function objects 206.

A function object is associated with a function of a source code file. That is, a source code file includes one or more functions, and each function is represented by a function object. Function object 206 includes, for instance, performance data 230 representing the performance of the function named by a function identifier 232; a parent indicator 234; and zero or more children 236. The inclusion of children depends, for instance, on the display mode being selected. If the display mode is thread-centric, then the function objects have no children. They are the leaves of the tree. If, however, the mode is function-centric, then there may be one or more thread objects for each function object.

A thread object is associated with a thread. A thread is a runtime execution entity within a runtime process. A thread is created at runtime and can execute one or more functions within one or more source code files associated with the parent process. Thread object 208 includes, for instance, performance data 238 representing the performance of the thread identified by a thread identifier 240; a parent identifier 242; and zero or more children 244. Again, the inclusion of children depends on the selected display mode. For example, in a function-centric mode, the thread objects have no children; while in a thread-centric mode, the children include one or more files objects.

In addition to the above objects, runtime-thread objects are defined for collecting performance data for threads entering an instrumented function. That is, there is one runtime-thread object for each thread in each selected function. Runtime-thread object 210 includes, for instance, performance data 246; a thread identifier 248; a process identifier 250; a file name 252; and a function name 254.

In one example, the objects are defined in a profile visualization tool. The tool uses graphical user interfaces (e.g., Java GUIs) to present the objects and their associated performance data. In particular, the objects are used to display performance data in a plurality of modes, as is described in further detail below.

Prior to presenting the data, however, the data is collected. One embodiment of the logic associated with collecting performance data is described with reference to FIG. 3.

Figure 3:
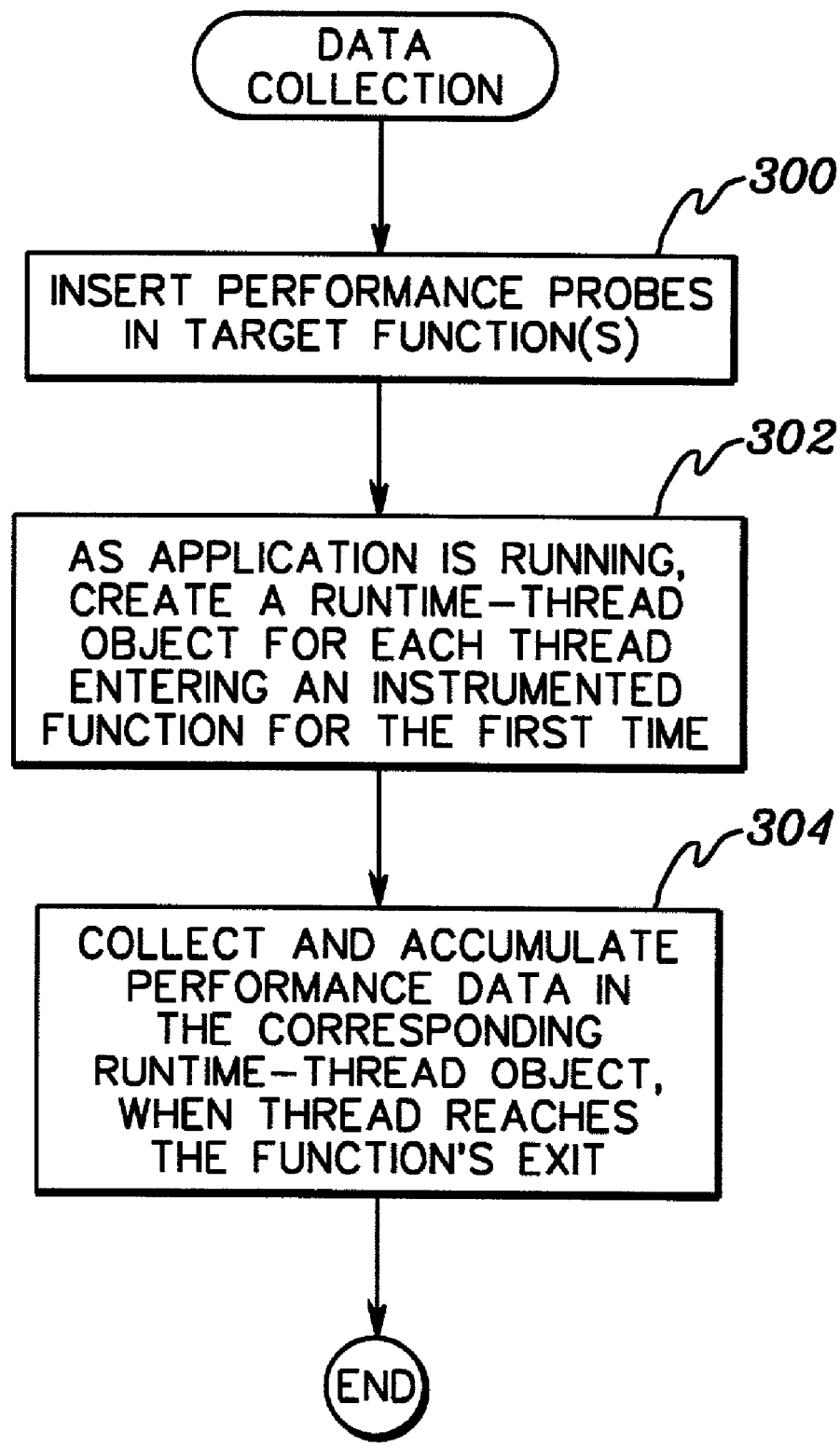
FIG. 3 depicts one embodiment of the logic associated with collecting performance data, which is used in accordance with an aspect of the present invention.

Referring to FIG. 3, initially, at least one pair of performance probes, each of which includes a block of code, is inserted into a target executable entity (e.g., application, program, task), STEP 300. In one embodiment, a user can choose to instrument one or more functions of an executable entity. To instrument a function, a probe is inserted into the entry point of the function and the exit point of the function. That is, the-probes are inserted as a pair in a selected function's entry and exit points.

When execution of the executable entity reaches an instrumented (i.e., selected) function, the corresponding probes are activated to collect the function's performance data. In one example, the probes make system calls to obtain the data. The performance data includes, for instance, profile data, such as the number of times a function is called, hardware performance counters, timers, etc. In particular, profile data related to threads is collected. The probes also collect other information, such as thread id, function name, file name, process id, etc.

The use of probes is only one way to collect data. The invention is not limited by any collection mechanism. In particular, the invention is not concerned with how the data is collected.

As the executable entity is running, a runtime-thread object is created, by the performance probes, for each thread entering an instrumented function for the first time. At the creation of the runtime-thread object, the thread id, process id, file name and function name are inserted into the object. When the thread reaches the function's exit point, the performance data is collected and accumulated in the corresponding runtime-thread object, STEP 304.

As mentioned above, there is one runtime-thread object for each thread in each selected function. That is, if a thread enters more than one selected function over the course of the execution, there will be one runtime-thread object for each function. In that scenario, each object has the same thread id, but a different function name (and possibly a different file name). At the end of the target executable entity's execution, each runtime-thread object contains its corresponding function's runtime performance data, which is referred to herein as the raw performance data.

After the data is collected, the data is organized and visualized, in accordance with an aspect of the present invention. As one example, one or more of the performance objects are organized into a hierarchical structure and the hierarchical structure is presented to the user, along with the performance data. The manner in which the data is organized and presented in the hierarchical structure is dependent on the display mode selected by the user.

In one embodiment, two display modes are offered in order to enable a user to analyze an application's performance data from different perspectives. In particular, the multiple display modes are used to facilitate the discovery of abnormal application behavior that may otherwise remain undetected. In one embodiment, the two display modes include the function-centric mode and the thread-centric mode. (In other embodiments, there may be other modes.)

In the function-centric mode, the focus is on what happened within each function. For example, how many threads executed the function and how much computer system resources (i.e., performance data) did each thread consume. Thus, in the function-centric mode, the focus point is function objects, and the calculation and presentation of the performance data are based on the thread activities inside each function object. This display mode helps users analyze function behavior, such that functions can be fine-tuned to optimize overall performance.

In the function-centric mode, the objects are organized in a tree structure as: process→file→function→thread. In this structure, a process object includes a set of file objects as its child objects, where each file object represents a source code file included in the executable entity (i.e., the process object). A file object includes a set of function objects as its child objects, where each function object represents a function resided in the source code file. A function object includes a set of thread objects as its child objects, where each thread object represents a runtime thread executed inside the function.

In the thread-centric mode, the focus is on runtime behavior. That is, what threads are created at runtime, which functions (within what source code file) does each thread visit at runtime, and how much computer system resource does each thread consume in each function it executes. This model is more dynamic. It reveals the runtime execution of threads and focuses on individual thread's activity, that cannot be observed by the traditional source code hierarchy model. That is, in a traditional source code hierarchy mode, the model only shows the relationship among process→file→function, since those are the components presented in the source code files.

Thus, in the thread-centric mode, the focus point is thread objects, and the calculation and presentation of the performance data are based on the function activities visited by each thread. This display mode helps users analyze thread activities, such that thread creation and execution can be fine-tuned to optimize overall performance.

In the thread-centric mode, the objects are organized in a tree structure as: process→thread→file→function. In this structure, each process object includes a set of thread objects as its child objects, where each thread object represents a thread activity that occurred in the executable entity. Each thread object includes a set of file objects as its child objects, where each file object represents a source code file that the thread visited at runtime. Each file object includes a set of function objects as its child objects, where each function object represents a function residing in the source file visited by the corresponding thread at runtime.

Figure 8:
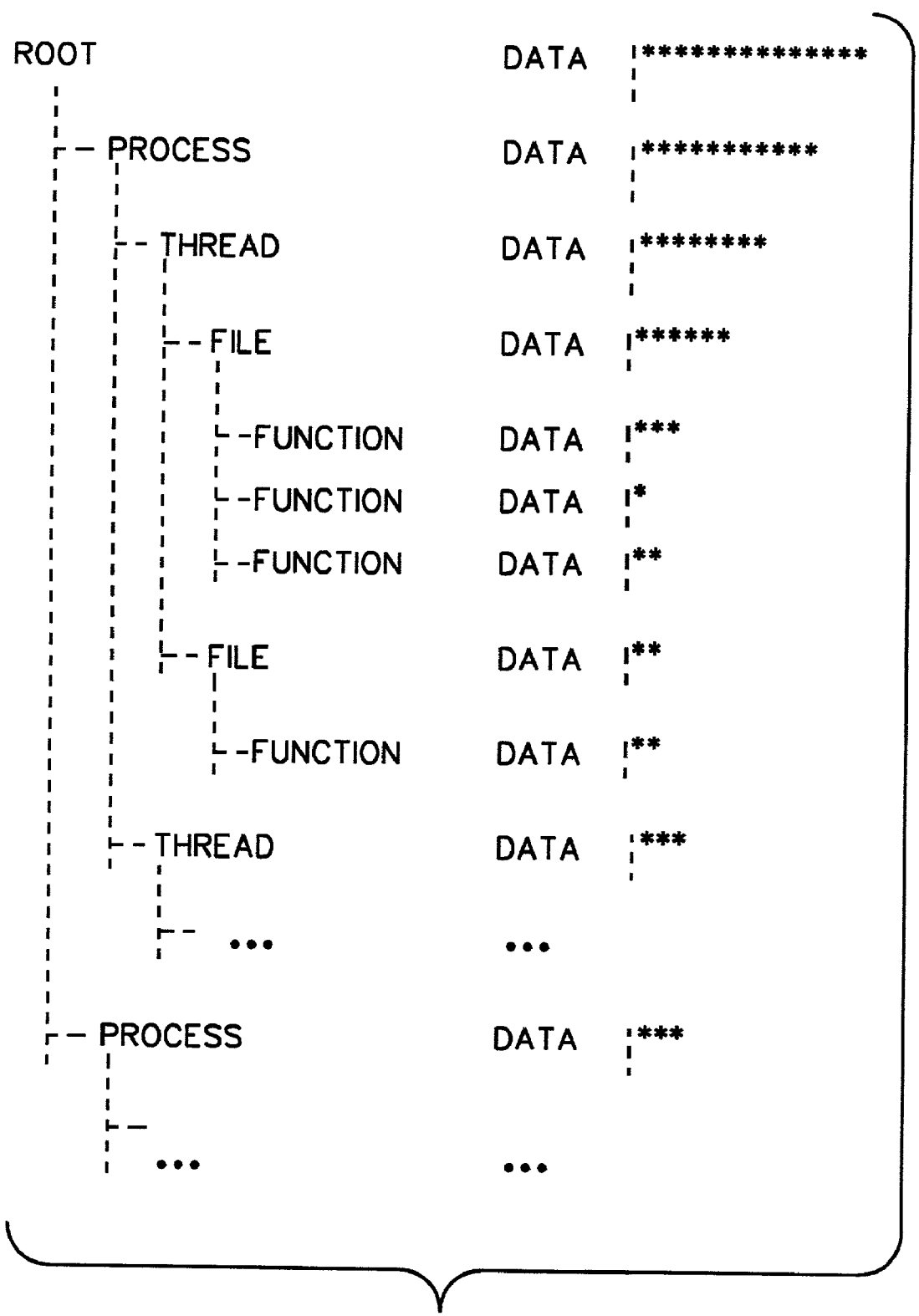
FIG. 8 depicts one embodiment of a graphical illustration of a hierarchical structure displayed in a thread-centric mode, in accordance with an aspect of the present invention.
Figure 9:
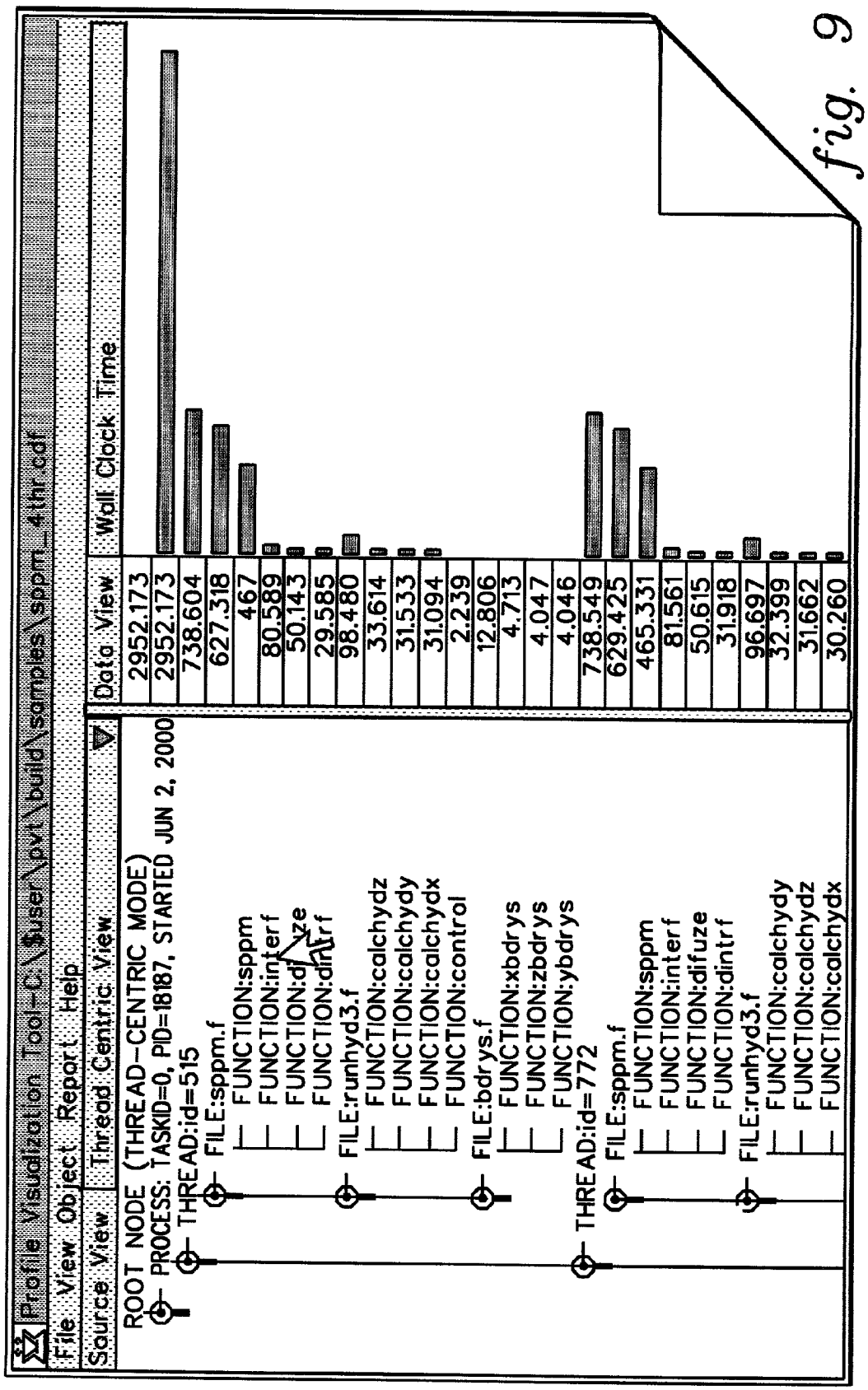
FIG. 9 depicts a more detailed embodiment of a graphical illustration of a hierarchical structure displayed in a thread-centric mode, in accordance with an aspect of the present invention.
Figure 10:
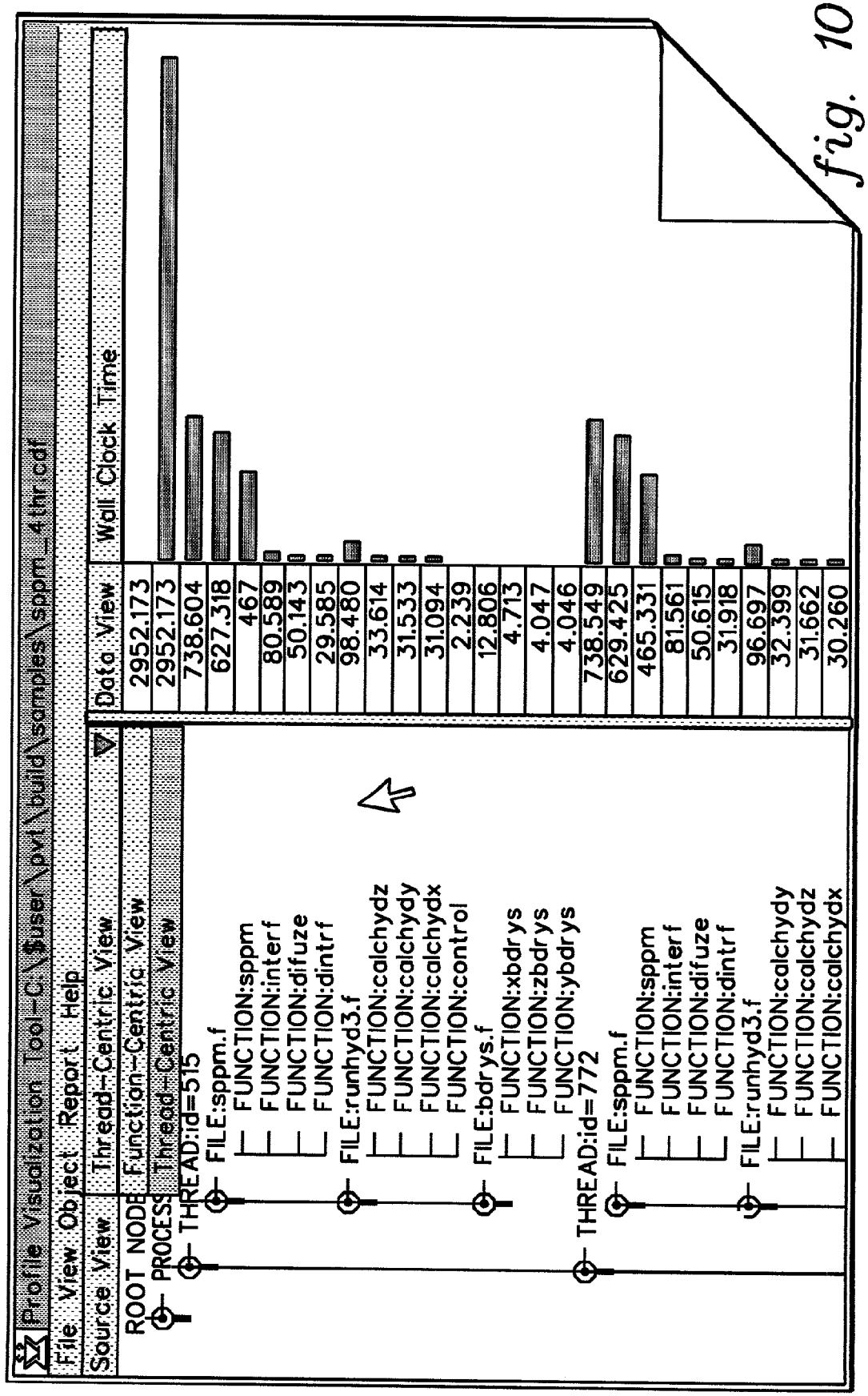
FIG. 10 illustrates the ability to alternately display the various modes, in accordance with an aspect of the present invention.

The manner in which data is organized and presented in the two modes is further described with reference to FIGS. 4-10. Initially, the function-centric mode is discussed with reference to FIGS. 4-6, and then the thread-centric mode is discussed with reference to FIGS. 7-9. FIG. 10 is used to illustrate the dynamic switching between the two modes.

Figure 4:
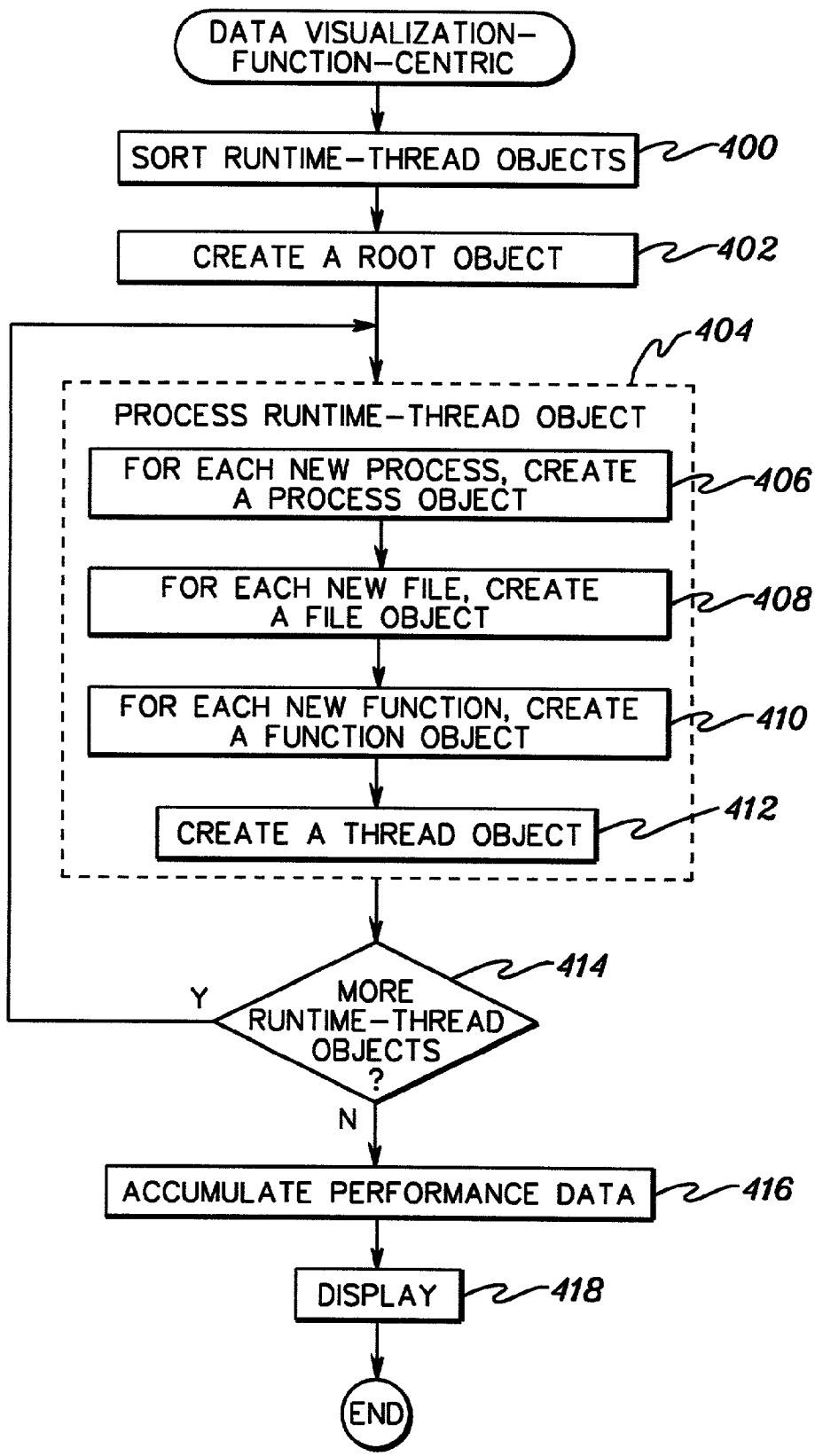
FIG. 4 depicts one embodiment of the logic associated with visualizing data in a function-centric mode, in accordance with an aspect of the present invention.

With reference to FIG. 4, one embodiment of the logic associated with data organization and visualization in a function-centric mode is described. The logic of FIG. 4 is executed by, for instance, an application tool running within the computing environment.

Referring to FIG. 4, the logic commences with sorting the runtime-thread objects created during the data collection phase, STEP 400. In one example, the runtime-thread objects are sorted by the order of process id, file name, function name and thread id. In addition to sorting the runtime-thread objects, a root object is created, which is the beginning of the hierarchical tree structure, STEP 402.

Thereafter, the sorted runtime-thread objects are processed in sequence, STEP 404. During processing of a runtime-thread object, a process object is created, if a new process id is encountered, STEP 406. The newly created process object is registered to the root object's children field, and the parent field of the process object includes a pointer to the root object. A graphical representation of this hierarchical construct is as follows:

```
root
 |--process.
```

Further, if a runtime-thread object includes a new file name, then a new file object is created, STEP 408. The newly created file object is registered to its parent process object's children field, and the parent field includes a pointer to the corresponding process object. A graphical representation of this new construct is as follows:

```
root
 |--process
     |--file.
```

Yet further, if a runtime-thread object includes a new function name, a new function object is created, STEP 410. The newly created function object is registered to its parent file object's children field, and the parent field includes a pointer to the corresponding file object. This is graphically represented as follows:

```
root
 |--process
     |--file
         |--function.
```

In addition to the above, a thread object is created for the runtime-thread object, STEP 412. The thread object is registered to its corresponding function object's children field, and its parent field includes a pointer to the corresponding function object. The thread object includes the raw performance data collected at runtime by the corresponding runtime-thread object. A graphical representation showing this hierarchy is depicted below:

```
root
 |--process
     |--file
         |--function
             |--thread.
```

Subsequent to creating the performance objects for the runtime-thread object being processed, a determination is made as to whether there are more runtime-thread objects to be processed, INQUIRY 414. If there are more runtime-thread objects to be processed, then processing continues with STEP 404, "Process Runtime-Thread Object." However, if there are no more runtime-thread objects to be processed, then the final result is a function-centric tree structure. A graphical representation of this tree structure is depicted below:

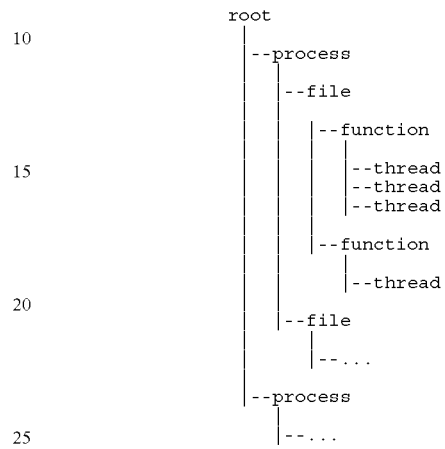

As mentioned above, each thread object in the tree contains the raw performance data for the thread collected during runtime. Each parent node uses this data to determine its own performance data. In particular, each parent adds up its children's performance data, and the result becomes its own performance data (which is referred to herein as the accumulated performance data), STEP 416. For example, if a function, Function X, has 3 children, Thread A, Thread B and Thread C, then the data associated with Threads A, B, C (e.g., 50, 25, 10) are added together to determine the accumulated performance data (e.g., 50+25+10=85) for Function X.

The accumulation process starts from the leaf nodes (i.e., the thread objects) and moves upward until it reaches the single root object. The root object's accumulated performance data represents the overall performance of the target application (see FIG. 6).

Figure 5:
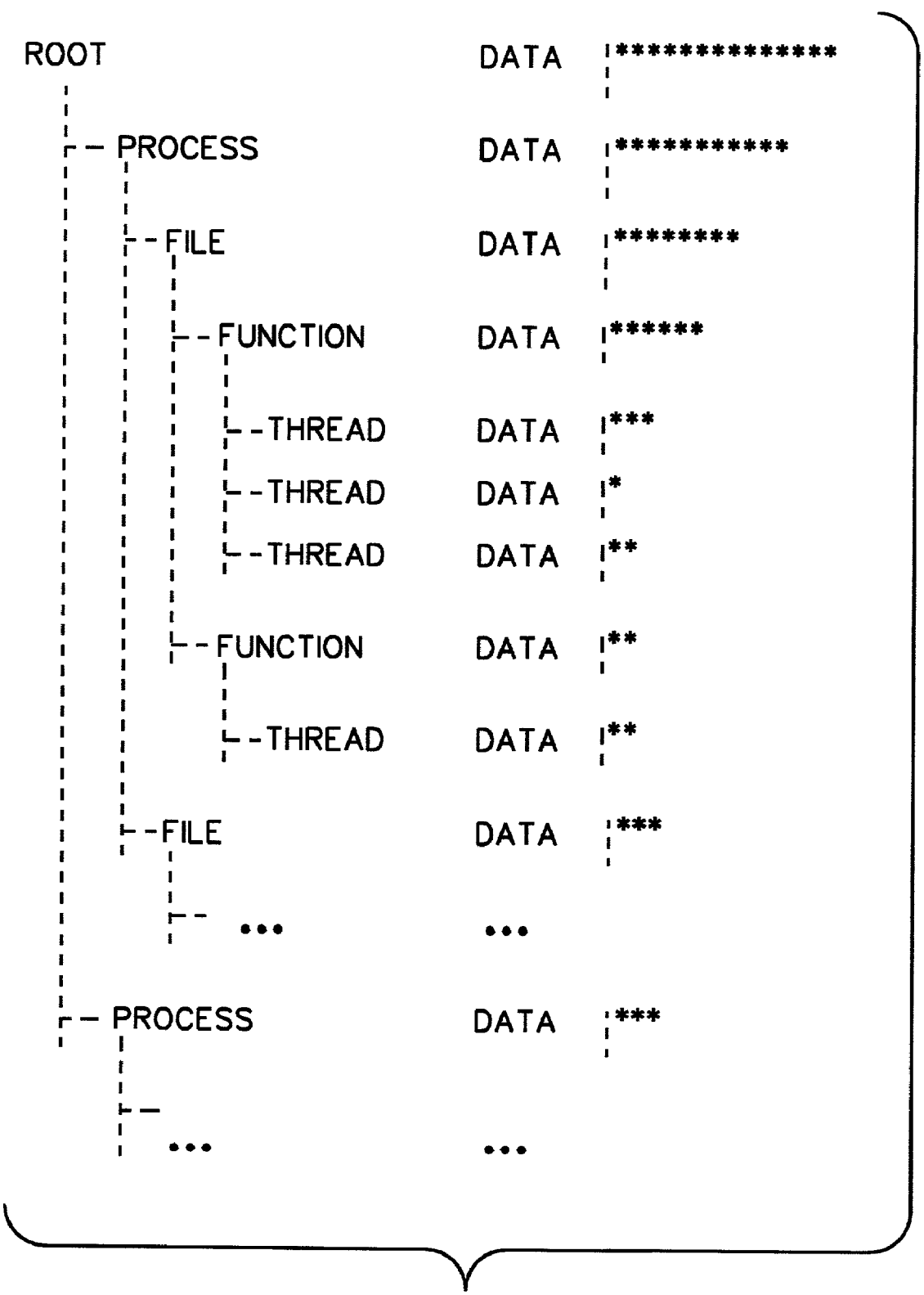
FIG. 5 depicts one embodiment of a graphical illustration of a hierarchical structure displayed in a function-centric mode, in accordance with an aspect of the present invention.

Once every node in the tree has its performance data, the data is presented to the user, STEP 418. In one example, the data is presented in a graphic display. The graphic display further includes a bar chart created according to each tree node's performance data. One example of such a bar chart is depicted in FIG. 5. Further examples of the hierarchical tree structure for a function-centric mode and the bar chart are depicted in FIG. 6.

Figure 6:
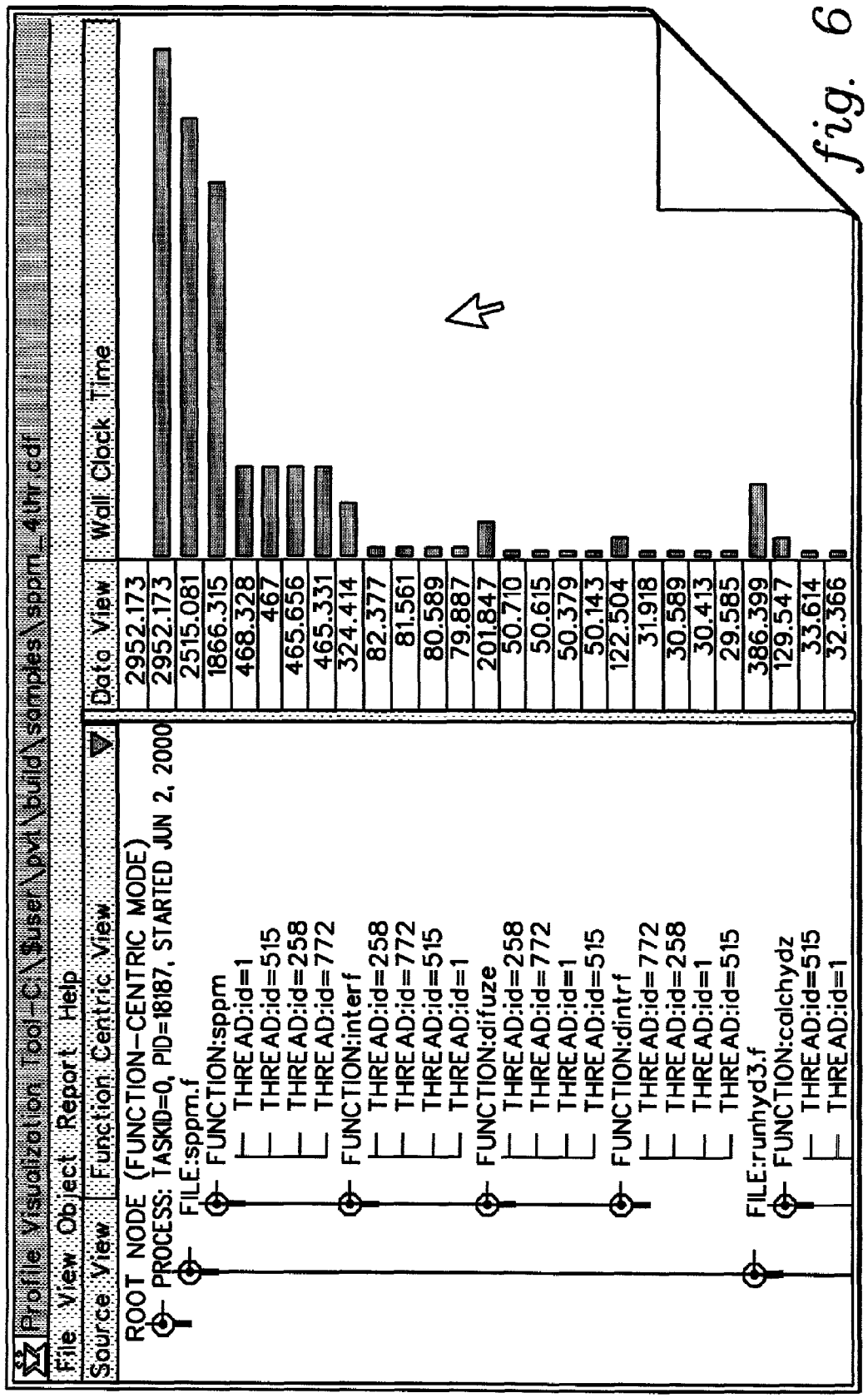
FIG. 6 depicts a more detailed embodiment of a graphical illustration of a hierarchical structure displayed in a function-centric mode, in accordance with an aspect of the present invention.

As shown in FIG. 6, there is performance data associated with each thread. Further, each function has accumulated performance data associated therewith. In particular, the accumulated data for each function represents the total data of its children threads. For example, the accumulated data (201.847) of Function:difuze is obtained by adding the raw data (50.710+50.615+50.379+50.143) for Threads 258, 772, 1 and 515, which are the children of that function.

Further, there is performance data associated with each file. Again, this is accumulated data. For example, the accumulated data (2515.081) for File:sppm.f is obtained by adding the accumulated data (1866.315+324.414+201.847+122.504) of its children functions (Function:sppm, Function:interf, Function:difuze and Function:dintrf).

Likewise, each process and the root have accumulated performance data associated therewith.

In addition to the function-centric mode, another organization and visualization mode is the thread-centric mode. One embodiment of the logic associated with data visualization in the thread-centric mode is described with reference to FIG. 7. In one example, this logic is performed by an application tool running within the computing environment.

Figure 7:
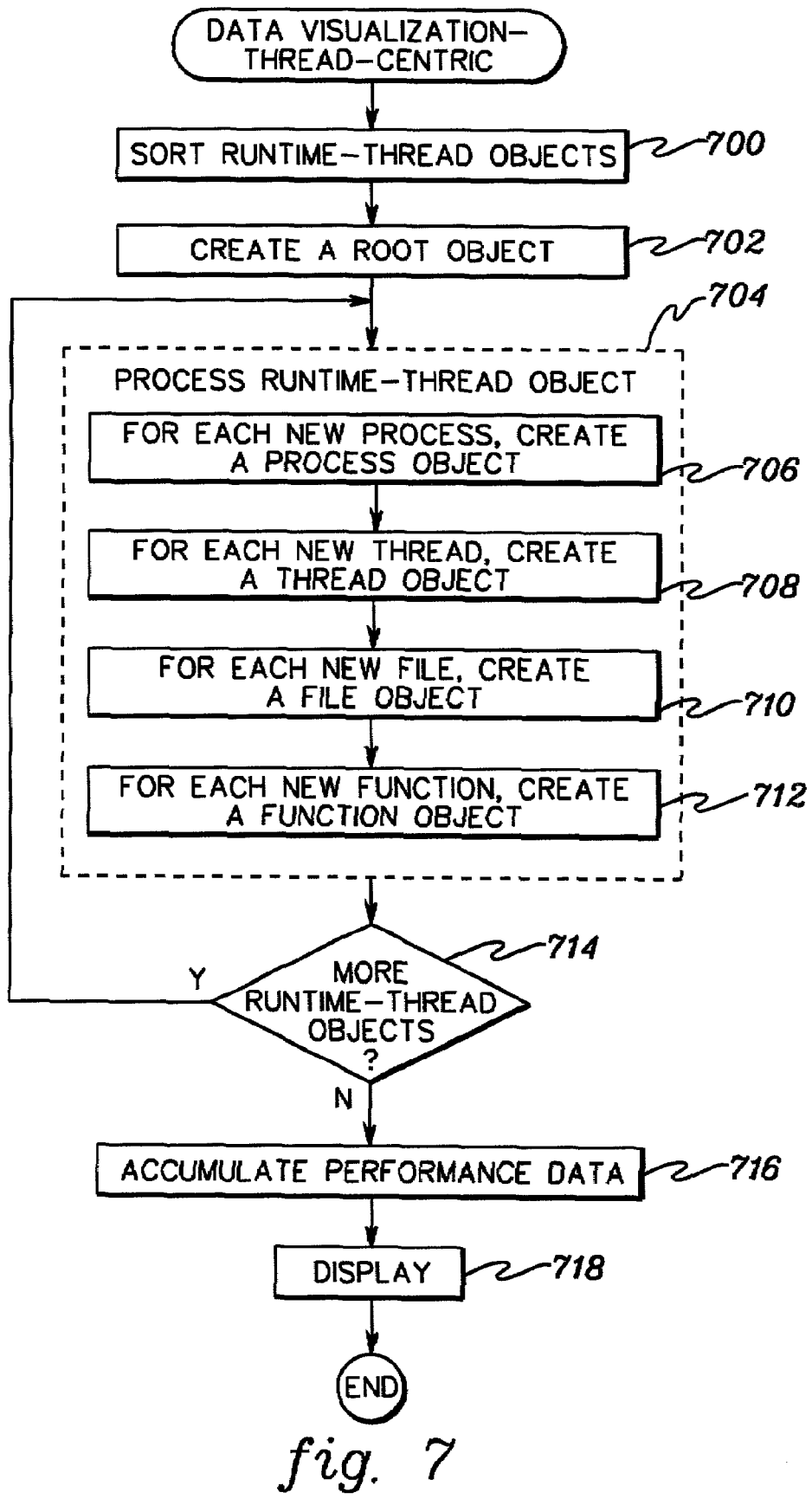
FIG. 7 depicts one embodiment of the logic associated with visualizing data in a thread-centric mode, in accordance with an aspect of the present invention.

Referring to FIG. 7, in order to create a thread-centric tree construct, initially, the runtime-thread objects are sorted, STEP 700. In one example, they are sorted by the order of process id, thread id, file name and function name. Further, a single root object is created, STEP 702.

Thereafter, the sorted runtime-thread objects are processed in sequence, STEP 704. During processing of a runtime-thread object, a new process object is created, if a new process id is encountered, STEP 706. The newly created process object is registered to the root object's children field, and its parent field includes a pointer to the root object. A graphical representation of this hierarchical construct is depicted below:

```
root
 |--process.
```

Further, if a runtime-thread object includes a new thread id, a new thread object is created, STEP 708. The newly created thread object is registered to its parent process object's children field, and its parent field includes a pointer to the corresponding process object. This is graphically depicted below:

```
root
 |--process
    |--thread.
```

Additionally, if a runtime-thread object includes a new file name, then a new file object is created, STEP 710. The newly created file object is registered to its parent thread object's children field, and its parent field includes a pointer to its corresponding thread object. A graphical representation of this hierarchy is as follows:

```
root
 |--process
    |--thread
       |-file.
```

Further, a function object is created for the runtime-thread object, STEP 712. The function object is registered to its corresponding file object's children field, and its parent field includes a pointer to the file object. Each function object includes the corresponding runtime-thread object's raw performance data collected at runtime. A graphical representation of this hierarchy is depicted as follows:

```
root
 |--process
    |--thread
       |--file
          |--function.
```

After processing a runtime-thread object, a determination is made as to whether there are more runtime-thread objects to be processed, INQUIRY 714. If there are more runtime-thread objects to be processed, then processing continues with STEP 704, "Process Runtime-Thread Object." The process is repeated until all the runtime-thread objects are processed. The final result is a thread-centric tree structure, as depicted below:

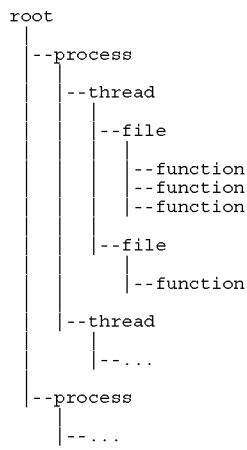

In this thread-centric model, each function object in the tree contains the raw performance data of the corresponding runtime-thread object. Thus, each parent node adds up its children's performance data to determine its own performance data, which is referred to as the accumulated performance data, STEP 716. The accumulation process starts from the leaf nodes (i.e., the function objects) and moves upward until the single root object is reached. The root object's accumulated performance data represents the overall performance of the target application.

Thereafter, the hierarchical structure and the corresponding data are displayed, STEP 718. A bar chart is created according to each tree node's performance data, and the bar chart is mapped to the corresponding tree node in the graphic display. One example of such a bar chart is depicted in FIG. 8. Further details regarding the bar chart and the hierarchical structure of the thread-centric mode are depicted in FIG. 9.

In accordance with an aspect of the present invention, there is one root node for the function-centric mode and one root node for the thread-centric mode. The function-centric mode is the default display mode, which is created when the runtime performance data is read (from the output file of the collection phase) for the first time. The thread-centric tree is created when a requirement for that mode is made for the first time. Once the two tree structures are created, users can switch from one mode to another without waiting for the tree structure to be created. Thus, the response time can be very fast (after the initial tree construction).

With the two display modes readily available and with the performance data attached to each tree node, users can dynamically switch from one mode to another, focusing either at the thread activity inside a particular function, or focusing on the files and functions visited by a runtime thread. This switch can occur from selecting either mode from a drop down menu on the user interface (see FIG. 10). When the user selects a particular mode, a pointer is used to present the appropriate tree.

With the ability to observe and analyze the performance data from different execution flow perspectives, users stand to have a better opportunity to discover hidden performance obstacles.

In accordance with an aspect of the present invention, performance data is defined as objects and those objects are presented in hierarchical tree structures. The tree structures are organized in two display modes, in which one mode focuses on function activities (function-centric mode) and the other mode focuses on thread activities (thread-centric mode). The two display modes are employed in a way that users can easily switch from one mode to another, in order to examine an application's performance data from different focus points. With this capability, users have better opportunities to discover hidden performance bottlenecks and to devise solutions to improve application performance. In one example, the capabilities of the present invention are included in a profile visualization tool.

The capabilities of the present invention provide ways to capture a multi-threaded application's runtime performance data, such that the performance data can be used to bind together the various components within an application.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of presenting data, said method comprising:
   selecting a display mode for displaying thread data of one or more threads of at least one application, said display mode comprising one of a function-centric display mode and a thread-centric display mode, wherein said selecting comprises dynamically switching, by a user, between said function-centric display mode and said thread-centric display mode;
   displaying said thread data based on the selected display mode, wherein if the selected display mode is the function-centric display mode, focus is on what happens within one or more functions of the at least one application, and said displaying comprises displaying a hierarchical structure which includes one or more functions having a parental relationship to the one or more threads, the hierarchical structure including corresponding thread data for each of the one or more threads of the one or more functions, and wherein a function includes accumulated thread data of a plurality of threads children to the function; and
   if the selected display mode is the thread-centric display mode, focus is on thread activity, and said displaying comprises displaying a hierarchical structure in which the one or more threads have a parental relationship to one or more other components of said at least one application, the hierarchical structure including corresponding thread data for each of the one or more threads, said corresponding thread data of a thread including accumulated data of a plurality of components to which the thread has a parental relationship.

2. The method of claim 1, wherein the corresponding thread data for a thread includes performance data of that thread as it pertains to a particular function.

3. The method of claim 1, wherein the corresponding thread data for a thread includes accumulated performance data of the one or more other components that are children of that thread.

4. The method of claim 1, wherein said thread data includes performance data of said one or more threads.

5. The method of claim 4, wherein said performance data comprises profile data of said one or more threads.

6. The method of claim 1, wherein said selected display mode is the function-centric display mode, and the thread data of a thread of said one or more threads comprises data indicating an amount of system resources consumed by the thread when executing a particular function of the at least one application.

7. The method of claim 1, wherein said selected display mode is the thread-centric display mode, and the thread data of a thread of said one or more threads comprises data indicating an amount of system resources consumed by the thread when executing one or more functions of the at least one application.

8. The method of claim 1, wherein the displaying based on a function-centric display mode comprises presenting a plurality of data structures in an organizational structure, said organizational structure being based on functional activities, and wherein said presenting comprises using a hierarchical structure of: process data structure→file data structure→function data structure→thread data structure.

9. The method of claim 1, wherein the displaying based on a thread-centric display mode comprises presenting a plurality of data structures in an organizational structure, said organizational structure being based on thread activities, and wherein the presenting comprises using a hierarchical structure of: process data structure→thread data structure→file data structure→function data structure.

10. A system of presenting data, said system comprising:
    a computing unit to:
    select a display mode for displaying thread data of one or more threads of at least one application, said display mode comprising one of a function-centric display mode and a thread-centric display mode, wherein said selecting comprises dynamically switching, by a user, between said function-centric display mode and said thread-centric display mode;
    display said thread data based on the selected display mode, wherein if the selected display mode is the function-centric display mode, focus is on what happens within one or more functions of the at least one application, and the display comprises displaying a hierarchical structure which includes one or more functions having a parental relationship to the one or more threads, the hierarchical structure including corresponding thread data for each of the one or more threads of the one or more functions, and wherein a function includes accumulated thread data of a plurality of threads children to the function; and
    if the selected display mode is the thread-centric display mode, focus is on thread activity, and the display comprises displaying a hierarchical structure in which the one or more threads have a parental relationship to one or more other components of said at least one application, the hierarchical structure including corresponding thread data for each of the one or more threads, said corresponding thread data of a thread including accumulated data of a plurality of components to which the thread has a parental relationship.

11. The system of claim 10, wherein the corresponding thread data for a thread includes performance data of that thread as it pertains to a particular function.

12. The system of claim 10, wherein the corresponding thread data for a thread includes accumulated performance data of the one or more other components that are children of that thread.

13. The system of claim 10, wherein said thread data includes performance data of said one or more threads.

14. The system of claim 13, wherein said performance data comprises profile data of said one or more threads.

15. The system of claim 10, wherein said selected display mode is the function-centric display mode, and the thread data of a thread of said one or more threads comprises data indicating an amount of system resources consumed by the thread when executing a particular function of the at least one application.

16. The system of claim 10, wherein said selected display mode is the thread-centric display mode, and the thread data of a thread of said one or more threads comprises data indicating an amount of system resources consumed by the thread when executing one or more functions of the at least one application.

17. The system of claim 10, wherein the display based on a function-centric display mode comprises presenting a plurality of data structures in an organizational structure, said organizational structure being based on functional activities, and wherein the presenting comprises using a hierarchical structure of: process data structure→file data structure→function data structure→thread data structure.

18. The system of claim 10, wherein the display based on a thread-centric display mode comprises presenting a plurality of data structures in an organizational structure, said organizational structure being based on thread activities, and wherein the presenting comprises using a hierarchical structure of: process data structure→thread data structure→file data structure→function data structure.

19. At least one program storage device readable by a machine, tangibly embodying at least one program of instructions executable by the machine to perform a method of presenting data, said method comprising:

selecting a display mode for displaying thread data of one or more threads of at least one application, said display mode comprising one of a function-centric display mode and a thread-centric display mode, wherein said selecting comprises dynamically switching, by a user, between said function-centric display mode and said thread-centric display mode;

displaying said thread data based on the selected display mode, wherein if the selected display mode is the function-centric display mode, focus is on what happens within one or more functions of the at least one application, and said displaying comprises displaying a hierarchical structure which includes one or more functions having a parental relationship to the one or more threads, the hierarchical structure including corresponding thread data for each of the one or more threads of the one or more functions, and wherein a function includes accumulated thread data of a plurality of threads children to the function; and if the selected display mode is the thread-centric display mode, focus is on thread activity, and said displaying comprises displaying a hierarchical structure in which the one or more threads have a parental relationship to one or more other components of said at least one application, the hierarchical structure including corresponding thread data for each of the one or more threads, said corresponding thread data of a thread including accumulated data of a plurality of components to which the thread has a parental relationship.

20. The at least one program storage device of claim 19, wherein the corresponding thread data for a thread includes performance data of that thread as it pertains to a particular function.

21. The at least one program storage device of claim 19, wherein the corresponding thread data for a thread includes accumulated performance data of the one or more other components that are children of that thread.

22. The at least one program storage device of claim 19, wherein said thread data includes performance data of said one or more threads.

23. The at least one program storage device of claim 22, wherein said performance data comprises profile data of said one or more threads.

24. The at least one program storage device of claim 19, wherein said selected display mode is the function-centric display mode, and the thread data of a thread of said one or more threads comprises data indicating an amount of system resources consumed by the thread when executing a particular function of the at least one application.

25. The at least one program storage device of claim 19, wherein said selected display mode is the thread-centric display mode, and the thread data of a thread of said one or more threads comprises data indicating an amount of system resources consumed by the thread when executing one or more functions of the at least one application.

26. The at least one program storage device of claim 19, wherein the displaying based on a function-centric display mode comprises presenting a plurality of data structures in an organizational structure, said organizational structure being based on functional activities, and wherein said presenting comprises using a hierarchical structure of: process data structure→file data structure→function data structure→thread data structure.

27. The at least one program storage device of claim 19, wherein the displaying based on a thread-centric display mode comprises presenting a plurality of data structures in an organizational structure, said organizational structure being based on thread activities, and wherein the presenting comprises using a hierarchical structure of: process data structure→thread data structure→file data structure→function data structure.

* * * * *